US006800854B2

(12) United States Patent
Pfister et al.

(10) Patent No.: US 6,800,854 B2
(45) Date of Patent: Oct. 5, 2004

(54) PASSIVE INFRARED DETECTOR

(75) Inventors: Martin Pfister, Jona (CH); David Siegwart, Mannedorf (CH)

(73) Assignee: Siemens Building Technologies AG, Zurich (CH)

( * ) Notice: Subject to any disclaimer, the term of this patent is extended or adjusted under 35 U.S.C. 154(b) by 155 days.

(21) Appl. No.: 10/282,526

(22) Filed: Oct. 29, 2002

(65) Prior Publication Data

US 2003/0136908 A1 Jul. 24, 2003

(30) Foreign Application Priority Data

Nov. 5, 2001 (EP) ........................................... 01126182

(51) Int. Cl.[7] ................................................ G01J 5/00

(52) U.S. Cl. ............................ 250/338.1; 250/DIG. 1; 250/338.3

(58) Field of Search .......................... 250/338.1, 336.1, 250/338.3, DIG. 1

(56) References Cited

U.S. PATENT DOCUMENTS 4,195,234 A 3/1980 Berman ...................... 307/117
5,629,676 A 5/1997 Kartoun et al. ............. 340/567
6,236,046 B1 * 5/2001 Watabe et al. ........... 250/338.1
6,288,395 B1 * 9/2001 Kuhnly et al. ......... 250/339.04

FOREIGN PATENT DOCUMENTS

| | | |
|---|---|---|
| DE | 19736214 | 3/1998 |
| EP | 0361224 | 9/1989 |
| EP | 0499177 | 8/1992 |
| EP | 0646901 | 9/1994 |
| EP | 1093100 | 10/1999 |

* cited by examiner

*Primary Examiner*—David Porta
*Assistant Examiner*—Christine Sung
(74) *Attorney, Agent, or Firm*—Baker Botts LLP

(57) ABSTRACT

A passive infrared detector has a first sensor (1) for generating an infrared signal, representative of the difference in temperature between a heat source and the background environment of the detector, a second sensor (3), influenced by the ambient temperature in the detector, and an evaluation circuit (2) for processing the infrared signal. The evaluation circuit contains a temperature compensation (4) for influencing the sensitivity of the detector as a function of the ambient temperature. The temperature compensation (4) is designed in such a way that the sensitivity of the detector is not directly influenced by changes in the ambient temperature. Influencing of the sensitivity of the detector takes place with delay and/or as a function of the speed of the change in the ambient temperature.

11 Claims, 1 Drawing Sheet

PASSIVE INFRARED DETECTOR

FIELD OF THE INVENTION

The invention relates to a passive infrared detector having a first sensor for generating an infrared signal representative of the difference in temperature between a heat source and its environment, a second sensor influenced by the ambient temperature of the detector, and an evaluation circuit for processing the infrared signal. The evaluation circuit has a temperature compensation for influencing the sensitivity of the detector as a function of said ambient temperature. The amplitude of the infrared signal is approximately proportional to the difference in temperature between the intruder and objects present in the background of the monitoring area which is hereinafter referred to as the background temperature. In actual fact the infrared signal corresponds to the Stefan Boltzmann Law, according to which the total radiation of the black body over all wavelengths per $cm^2$ is proportional to the 4th power of the absolute temperature of the body. The sensitivity or detection range of passive infrared detectors is thus largely dependent on the background temperature, which means that the sensitivity decreases as the difference in temperature decreases, which is the case when the background temperature approximates the body temperature of the intruder, for example, in hot or tropical regions.

If one assumes that a space normally has a homogeneous temperature distribution, so that the background temperature is approximately identical to the ambient temperature of the detector and changes synchronously with it, the second sensor then delivers not only information on the ambient temperature but also on the background temperature. The second sensor thus opens up the possibility of recognizing an increase in background temperature to body temperature, and therewith associated reduction in the contrast in temperature between an intruder and the background, and amplifying the infrared signal as a function of the ambient temperature. Alternatively, the amplification of the infrared signal can remain unchanged and the alarm threshold of the detector can be changed appropriately.

BACKGROUND OF THE INVENTION

Such a detector is described in U.S. Pat. No. 4,195,234 and has a constant detection sensitivity. However, when the ambient temperature exceeds the body temperature of the intruder, the amplification of the infrared signal is increased or the alarm threshold reduced. Also, when the body temperature drops below the ambient temperature, the detection sensitivity does not remain constant. These circumstances constitute undesireable drawbacks of the aforesaid detector.

In U.S. Pat. No. 5,629,676 a passive infrared detector is described, the sensitivity of which is designed to remain substantially constant even when the ambient temperature exceeds human body temperature. This aim is achieved in that after the minimum contrast in temperature has been exceeded, when intruder and background have approximately the same temperature, the sensitivity of the detector is reduced. The second sensor is usually arranged on the detector absorber plate provided inside the detector, and does not measure the background temperature or strictly speaking, even the temperature in the environment of the detector, but the temperature inside the detector. This can cause a mismatch of the sensitivity to occur, owing to a warm or cold draught at the site of the detector, because the detector heats up or cools down too much or too quickly compared with the background. This mismatch can lead to a reduction in the robustness of the detector rendering it susceptible to parasitic inductions, such as, for example, white light or EMC interferers and such.

SUMMARY OF THE INVENTION

The object of the present invention is to provide a passive infrared detector of the kind described above, but in which a temperature compensation mean has the effect of minimizing detector false alarms. This object is achieved according to the present invention by designing the temperature compensation in such a way that changes in the ambient temperature do not directly influence the sensitivity of the detector. The second sensor is preferably formed by a temperature sensor arranged inside the detector.

In a preferred embodiment of the detector according to the invention the influencing of the sensitivity of the detector takes place only after a delay. The delay is preferably effected when an increase in the ambient temperature would cause an increase in the sensitivity of the detector. The delay is different for an increase or decrease in the ambient temperature and/or above and below a minimum value of the difference in temperature between the heat source and the environment. The delay is preferably of a duration dependent on parameters, such as the speed of the change in ambient temperature, and/or by the absolute temperature. The delay may take place by electronic means or by heat insulation of the second sensor or of the component influenced by the ambient temperature. By delaying the influencing of the sensitivity of the detector, short local temperature variations of the detector (or in its direct environment) will not influence the sensitivity of the detector, and the temperature compensation will depend substantially on the course of the background temperature.

In another preferred embodiment of the detector according to the present invention, influencing of the sensitivity of the detector takes place as a function of the speed of the change in the ambient temperature. Preferably, when a presettable first value of the speed of the change in temperature is exceeded, the temperature compensation is switched over from a first to a second mode, and back to the first mode only after a drop below a second value of the speed. For example, the temperature compensation is activated in the first mode and deactivated in the second. Taking into account the speed of the change in ambient temperature has the advantage that abnormally fast temperature changes are suppressed and cannot lead to false alarms owing to unnecessarily increased sensitivity of the detector.

BRIEF DESCRIPTION OF THE DRAWINGS

The invention is further described below in connection with the drawings, in which.

DETAILED DESCRIPTION OF THE INVENTION

Figure 1:
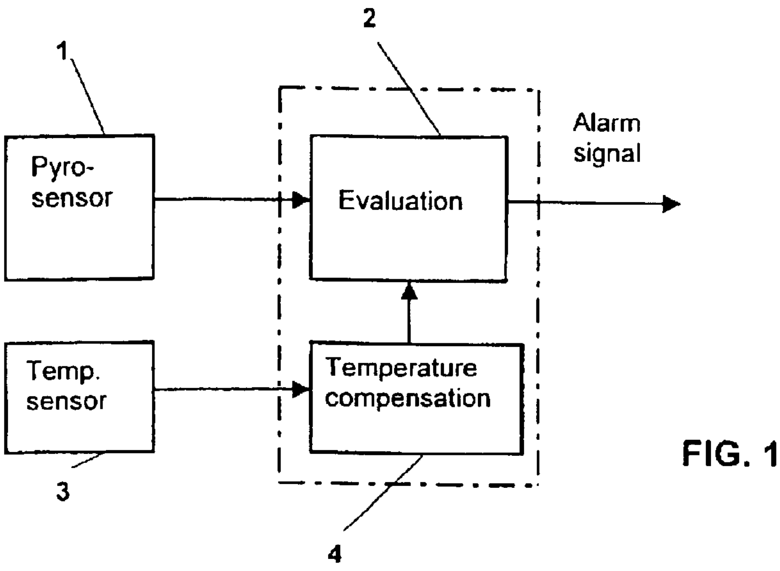
FIG. 1 illustrates a block diagram of a passive infrared detector according to the invention.

The passive infrared detector schematically illustrated in FIG. 1 is of conventional structure and contains in particular a pyrosensor 1 and an evaluation stage 2 for evaluating the sensor signals. If there is a change in the received infrared energy the pyrosensor 1 generates a signal which is further processed in the evaluation stage 2 for releasing an alarm. The structure of a passive infrared detector of this kind is known and in this context reference is made to EP-A-0 361 224, 0 499 177 and 1 093 100.

The pyrosensor 1 is, for example, a so-called standard dual pyrosensor, as used in the passive infrared detectors of Siemens Building Technologies AG, formerly Cerberus AG. Standard dual pyrosensors of this kind contain two heat-sensitive elements or flakes, the images of which on the floor or a wall of a monitoring space define the monitoring areas from the border of which a bundle of rays runs in each case to the respective flake. As soon as an object emitting heat radiation crosses a bundle of rays, or in other words intrudes into a monitoring space, the sensor 1 detects the heat radiation emitted by this object.

There are two conditions for detection of this heat radiation, on the one hand a movement of the object emitting the heat radiation, and on the other hand the presence of a difference in temperature or a contrast in temperature between said object, for example an intruder and its background. This is because the detector reacts to the characteristic change in the signal representing the received heat radiation when the intruder enter the monitoring area and/or when he leaves it. These changes in signal can naturally occur only if the intruder moves and additionally stands out from the background in terms of temperature. An intruder is therefore all the more safely detected the more his temperature differs from that of the background.

The signal of the pyrosensor 1 is therefore an infrared signal representing the difference in temperature between a heat source (intruder) and the background. The amplitude of the infrared signal is proportional to this difference in temperature, even if the infrared signal strictly speaking obeys the Stefan Boltzmann Law, according to which the total radiation of a black body over all wavelengths per $cm^2$ is proportional to the 4th power of the absolute temperature of the body. Where the body temperature of an intruder is substantially constant, the sensitivity or the detection area of a passive infrared detector is largely dependent on the background temperature. The closer this is to the intruder's body temperature, the less the sensitivity of the detector becomes.

To achieve a largely constant sensitivity of the detector over a wide area of the background temperature, the detector is equipped with a component influenced by the ambient temperature, preferably a temperature sensor 3, and a temperature compensation 4. The temperature compensation 4 constantly receives from the temperature sensor 3, preferably arranged on the absorber plate of the detector, the ambient temperature T (FIG. 2) and increases the detection sensitivity in a specific temperature range of, for example, 20° to 35°. This increase takes place either by an appropriate change in the amplification of the signal of the pyrosensor 1 or by reducing the alarm threshold with which the infrared signal is compared. In the case of evaluation with the aid of fuzzy logic (see EP-A-0 646 901) the association functions of the signal of the pyrosensor 1 would analogously be adapted according to the different fuzzy sets.

As the temperature sensor 3 is arranged on the detector absorber plate, strictly speaking it does not measure the background temperature, but rather the temperature of the detector. In most cases this is of little or no importance since these two temperatures are substantially identical, but it can occur that the detector may heat up or cool down too quickly compared with the background, for example as a result of a draught, which does trigger an unmatched temperature compensation. This can, in turn lead to a reduction in the robustness of the detector rendering it susceptible to parasitic inductions such as, for example, white light or EMC interferers.

To reduce or eliminate this potential source of false alarm the temperature compensation 4 is designed in such a way that if the ambient temperature which influences the temperature sensor 3 changes, there is no direct influence on the sensitivity of the detector. For this purpose influencing of the sensitivity of the detector takes place with a delay, which causes a change in the ambient temperature to affect the sensitivity of the detector only after a specific time Δt. This delay takes place in cases where, due to an increase in the ambient temperature (and the supposition derived therefrom that the contrast in temperature between an intruder and the background has been reduced), an automatic increase in sensitivity would take place. The delay can be different, depending on whether the temperature measured by the temperature sensor 3 rises or drops and/or how great the difference is between the temperature of the intruder and the background temperature. The delay can be rigidly preset or can be of a duration dependent on specific parameters, such as, for example, speed of the change in temperature or level of the absolute temperature. The delay is preferably produced electronically. It is also possible, however, to effect the delay by means of heat insulation of the temperature sensor 3 or of the component influenced by the ambient temperature.

In addition to the delay, or as an alternative to it, the temperature compensation can be controlled as a function of the speed of the change in the ambient temperature measured by the temperature sensor 3. In this case the temperature compensation is adapted if a specific threshold of change in speed is exceeded, and switched back to the original value only when there is a drop below this or some other threshold. Adaptation means in this context switching over from a mode with normal temperature compensation to a different mode with reduced temperature compensation. Adaptation can also mean that the temperature compensation is deactivated if said threshold is exceeded and re-activated only when there is a drop below this threshold.

Figure 2:
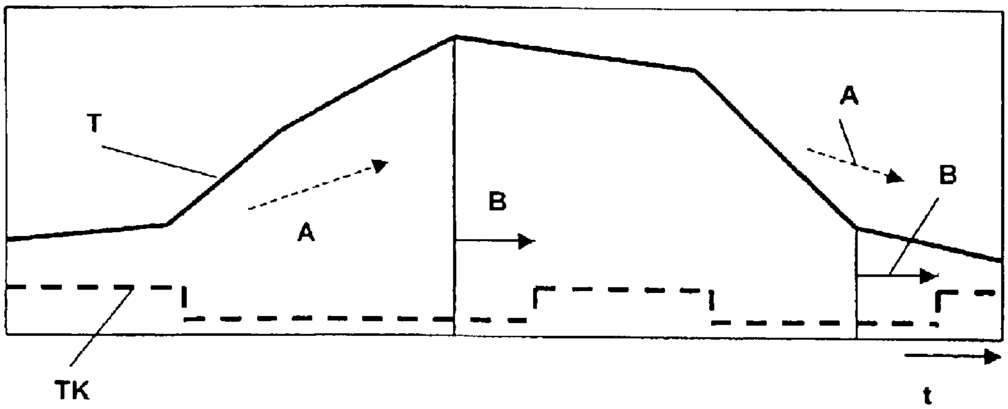
FIG. 2 illustrates by a diagram how the detector functions.

In FIG. 2 the last mentioned method of temperature compensation is explained using a diagram. As shown the ambient temperature measured by the temperature sensor 3 is designated by the reference numeral T and the mode of temperature compensation 4 with the curve TK, drawn as a dotted line. The upper line of curve TK reproduces the mode "temperature compensation normal" and the lower line the mode "temperature compensation reduced". The dotted arrows A indicate the maximum gradient of the change in temperature below which the temperature compensation is operated in its normal mode. The arrows B designate a delay before switching over the temperature compensation to normal mode.

We claim:

1. A passive infrared detector comprising a first sensor for generating an infrared signal, representative of a difference in temperature between a heat source and its background, a second sensor which is influenced by ambient temperatures of the detector, and an evaluation circuit for processing the infrared signal, the evaluation circuit has a temperature compensation means for influencing the sensitivity of the detector as a function of said ambient temperatures, wherein the temperature compensation means is designed in such a way that if there is a change in the ambient temperature no direct influencing of the sensitivity of the detector takes place.

2. The detector according to claim 1, wherein the second sensor is formed by a temperature sensor arranged inside the detector.

3. The detector according to claim 2, wherein the sensitivity the detector is influenced only after a delay.

4. The detector according to claim 3, wherein the delay occurs when an increase in the ambient temperature would cause an increase in the sensitivity of the detector.

5. The detector according to claim 3, wherein the delay is different depending on whether the ambient temperature rises, falls and/or rises or falls above or below a predetermined minimum value based on a difference in temperature between the heat source and its background.

6. The detector according to claim 3, wherein the delay has a duration dependent on parameters selected from the group consisting of the speed of change in the ambient temperature and/or by an absolute temperature.

7. The detector according to claim 3, wherein the delay is activated electronically.

8. The detector according to claim 3, wherein the delay occurs by means of heat insulation of the second sensor or other component influenced by the ambient temperature.

9. The detector according to one of claim 1, wherein the sensitivity of the detector is influenced as a function of the speed of change in the ambient temperature.

10. The detector according to claim 9, wherein, if a predefined first value of the speed of the change in temperature is exceeded, the temperature compensation is switched over from a first to a second mode and back to the first mode only after there has been a drop below a second value of the speed of change.

11. The detector according to claim 10, wherein the temperature compensation is activated in the first mode and deactivated in the second mode.

* * * * *